(12) United States Patent
De Graaf

(10) Patent No.: US 9,283,722 B2
(45) Date of Patent: Mar. 15, 2016

(54) BUILDING DRUM WITH LOCKING DEVICE

(75) Inventor: Martin De Graaf, KZ Emst (NL)

(73) Assignee: VMI HOLLAND B.V., Epe (NL)

( * ) Notice: Subject to any disclaimer, the term of this patent is extended or adjusted under 35 U.S.C. 154(b) by 543 days.

(21) Appl. No.: 13/806,145

(22) PCT Filed: Feb. 10, 2012

(86) PCT No.: PCT/NL2012/050072
§ 371 (c)(1),
(2), (4) Date: Jan. 28, 2013

(87) PCT Pub. No.: WO2012/108770
PCT Pub. Date: Aug. 16, 2012

(65) Prior Publication Data
US 2013/0160951 A1    Jun. 27, 2013

Related U.S. Application Data

(60) Provisional application No. 61/441,691, filed on Feb. 11, 2011.

(30) Foreign Application Priority Data

Feb. 11, 2011    (NL) ...................................... 2006181

(51) Int. Cl.
*B29D 30/26* (2006.01)
*B29D 30/08* (2006.01)
*B29D 30/24* (2006.01)

(52) U.S. Cl.
CPC .............. *B29D 30/26* (2013.01); *B29D 30/08* (2013.01); *B29D 30/24* (2013.01)

(58) Field of Classification Search
CPC .................. B29D 30/24; B29D 30/26; B29D 2030/2664; B23B 31/1074

USPC .......... 156/414–420; 403/315–319, 324, 325, 403/379.2, 379.5, 378; 279/76, 86, 97; 464/905; 285/91, 404; 242/597.3, 242/597.2

See application file for complete search history.

(56) References Cited

U.S. PATENT DOCUMENTS 1,504,905 A    8/1924    Ruffcorn
3,658,352 A *  4/1972    Koch et al. ...................... 279/89
(Continued)

FOREIGN PATENT DOCUMENTS

DE    41 06 096 C1    10/1992
EP    1 771 295 B1    9/2008
JP    58-049234 A *    3/1983

*Primary Examiner* — Geoffrey L Knable
(74) *Attorney, Agent, or Firm* — Ladas & Parry LLP

(57) ABSTRACT

The invention provides a building drum for building an unvulcanized tire or air spring using rubber components. The building drum comprises a central shaft and a casing that can be slid onto the shaft. The casing is detachably attached to the shaft via a coupling pin that can be moved to a coupled position for mutually coupling the shaft and the casing and into an uncoupled position in which the casing can be removed from the central shaft. The casing further comprises a locking device with a locking pin, wherein the locking pin is adapted for, in the coupled position of the coupling pin, engaging thereon for substantially blocking a movement of the coupling pin. The locking device comprises a locking member that in a condition in which the locking pin does not engage onto the coupling pin, is placed such that it prevents a connection of lines to the casing, and/or provides an indication of the casing being mounted incorrectly.

19 Claims, 5 Drawing Sheets

(56) References Cited

U.S. PATENT DOCUMENTS

| | | |
|---|---|---|
| 4,521,269 A | 6/1985 | Ozawa |
| 4,699,298 A * | 10/1987 | Grant et al. ............... 222/400.7 |
| 2009/0045593 A1 * | 2/2009 | Reinauer ..................... 279/22 |
| 2009/0266490 A1 * | 10/2009 | De Graaf ..................... 156/416 |

* cited by examiner

BUILDING DRUM WITH LOCKING DEVICE

RELATED APPLICATION INFORMATION

This application is a 371 of International Application PCT/NL2012/050072 filed 10 Feb. 2012 entitled "Building Drum With Locking Device", which was published in the English language on 16 Aug. 2012, with International Publication Number WO 2012/108770 A1, and which claims priority from Netherlands Patent Application 2006181, filed 11 Feb. 2011, and U.S. Provisional Application No. 61/441,691 filed 11 Feb. 2011, the content of which is incorporated herein by reference.

BACKGROUND OF THE INVENTION

The invention relates to a building drum for building an unvulcanized tyre or air spring using rubber components. The building drum comprises:
  a central shaft with a circumferential wall having an outer diameter,
    a casing with a circumferential surface for arranging the components thereon, wherein the casing comprises a substantially continuous opening having an inner diameter that corresponds with the outer diameter of the circumferential wall of the central shaft, wherein the casing is detachably attached to the central shaft.

Such a building drum to be used in building an unvulcanized tyre using rubber tyre components, with reinforcement cords and two beads that may or may not be provided with a bead filling strip, is described in European patent 1.771.295. Said patent describes an assembly including tyre drum with turn-up mechanism, wherein the tyre drum is provided with a central shaft, wherein the assembly comprises at least two pairs of casings, wherein the first pair of casings is adapted to a first, smallest bead size of a first tyre and the second pair of casings is adapted to a second, larger bead size of a second tyre, wherein the pairs of tyres are arranged on the central shaft in an interchangeable manner.

The tyre building drum according to European patent 1.774.295 comprises a horizontal hollow shaft that is rotatable about a centre line, within which hollow shaft a spindle shaft is arranged, on which two sleeve-shaped nuts are arranged in a movable manner. Pins extend from the sleeve-shaped nuts in radial direction through axially oriented slits in the hollow shaft. On the pins a casing is attached, which as a result is axially movable with the nut at rotation of the spindle shaft.

Several casings are present in the assembly, wherein the other pairs of casings are substantially similarly shaped, at least having the same inner diameter. The other casings are prepared for a certain tyre dimension, through turn-up arms, bead clamping sections, bead inner supports etc. all adjusted thereto being mounting beforehand. When changing from manufacturing the one tyre size to the other tyre size, the casings are changed by at a free outer end of the drum, removing an end plate and also the compressed air connection, and uncoupling the pins of the casings on the central shaft. The casings can then be slid from the hollow shaft via the free outer end. Other casings for manufacturing tyres of another tyre size can be slid onto the hollow shaft via the free outer end, and be connected to the pins.

The casings being interchangeable on the one hand renders repair and maintenance of the casings relatively simple, also because said activities do not need to take place on the machine. On the other hand it ensures that a first set of casings for manufacturing tyres or air springs of a first type, can quite easily be replaced by another, second set of casings for manufacturing tyres or air springs of a second type that is different from the first type.

A building drum with an interchangeable casing is for instance known from U.S. Pat. No. 4,521,269. Said patent describes a building drum that is provided with a central shaft with a circumferential wall having an outer diameter, and with a casing with a circumferential surface for arranging the components thereon, wherein the casing comprises a substantially continuous opening having an inner diameter corresponding with the outer diameter of the circumferential wall of the central shaft, wherein the casing is detachably attached on the central shaft, and wherein the casing is provided with a coupling pin that is moveable from a coupled position in which the coupling pin extends in an opening in the circumferential wall of the central shaft, to an uncoupled position in which the coupling pin is placed outside of the circumferential wall of the central shaft.

However for the building drum to operate properly and to prevent damage, it is highly desirable that the casings are adequately and fixedly connected to the shaft, at least prior to the building drum becoming operational.

SUMMARY OF THE INVENTION

It therefore is an object of the invention to provide a building drum having exchangeable casings, with an improved coupling for attaching exchangeable casings to the central shaft.

According to a first aspect the invention for that purpose provides a building drum as described in claim 1. The building drum according to the invention is characterised in that the casing further comprises a locking device with a locking pin, wherein the locking pin is adapted for in the coupled position of the coupling pin engaging thereon in order to substantially block a movement of the coupling pin, wherein the casing comprises a connecting device for connecting an electric, pneumatic or hydraulic line to the casing, and wherein the locking device comprises a locking member, wherein the locking member in a condition in which the locking pin does not engage onto the coupling pin, is placed such with respect to the connecting device that the locking member substantially prevents a connection of the line to the connecting device.

The casing according to the invention on the one hand comprises a locking device for locking, so protecting against getting detached, the locking pin in the coupled position. In that way it can be substantially prevented that the coupling pin gets detached when this is not desirable, as a result of which the casing would no longer properly move along with a rotation of the shaft. In case the casing does not properly move along with the shaft, the building drum could get damaged. By means of the casing according to the invention, such damage, and as a consequence the standstill required for repair, can at least be substantially avoided.

On the other hand the casing according to the invention comprises a connecting device for connecting an electric, pneumatic or hydraulic line to the casing, wherein the locking member in a condition in which the locking pin does not engage onto the coupling pin, is placed such with respect to the connecting device that the locking member substantially prevents a connection of the line to the connecting device. If the locking pin does not lock the coupling pin in the coupled position, the line cannot be connected to the connecting device, as a result of which the building drum cannot become operational. If during mounting a casing the line can be connected to the connecting device, the coupling pin will be in the coupled position and in this position protected by the locking device.

In one embodiment the locking member is adapted for, at least in the condition in which the locking pin does not engage onto the coupling pin, providing an indication of the incorrect mounting of the casing. Preferably the indication is a visual indication visible to a mechanic, which indication preferably is visible from the outside of the casing. When mounting the locking member provides a clear indication of the incorrect mounting of the casing, and thus also an indication of the correct mounting of the casing.

In a simple embodiment the coupling pin comprises a centre line, wherein the coupling pin can be moved along the centre line between the coupled position and the uncoupled position, and wherein the locking pin can be moved substantially transverse to the centre line.

In one embodiment the path of the locking pin crosses the centre line of the coupling pin, as a result of which the locking pin is able to extend into the path of the coupling pin for substantially blocking a movement of the coupling pin.

In one embodiment the coupling pin is provided with an opening, wherein the opening in the coupled position of the coupling pin is placed in an extension of the locking pin. By inserting the locking pin in the opening the coupling pin in the coupled position is protected against getting detached. Preferably the opening is designed such that in other positions than the coupled position of the coupling pin it is inaccessible to the locking pin, and therefore no locking is possible in other positions than the coupled position.

In a simple embodiment the locking member is a part of the locking pin. In one embodiment the locking member is placed on a side of the locking pin that faces away from the coupling pin.

In an alternative embodiment the locking pin on a side facing away from the coupling pin substantially abuts the locking member, wherein the locking pin, at least in the condition in which the locking pin does not engage onto the coupling pin, keeps the locking member in the condition that substantially prevents a connection of the line to the connecting device. In that way the locking pin can also at least partially lock the position of the locking member.

In one embodiment the locking member is adapted for bringing the locking pin into engagement with the coupling pin in the coupled position of the coupling pin. By operating the locking member the locking pin can be brought into engagement with the coupling pin that is in the coupled position.

In one embodiment the locking member is pre-stressed to the condition that substantially prevents a connection of the line to the connecting device.

In one embodiment the locking member, in the condition in which the locking pin does not engage onto the coupling pin, extends outside of a circumferential surface of the casing or outside of a distal outer end of the casing. In that way the position of the locking pin, easily visible on the outside of the casing, shows whether or not the locking pin engages onto the coupling pin.

In one embodiment the connecting device is placed substantially in or close to a distal outer end of the casing, wherein a first set of lines is connected to a building drum mounting ring, which building drum mounting ring can be rotation-fixedly connected to the respective distal outer end of the casing for forming a connection between the lines of the first set of lines and the connecting device, and wherein the locking member extending out of the casing and/or locking pin substantially prevent a connection of the building drum mounting ring to the distal outer end of the casing. If the coupling pin is in the coupled position and is protected and/or confined by the locking pin, the locking member and/or the locking pin will at least be placed substantially within the casing, as a result of which the building drum mounting ring can be connected to the distal outer end of the casing for forming a connection between the lines of the first set of lines and the connecting device.

In one embodiment the central shaft is a hollow shaft, wherein within the hollow shaft a drive mechanism is placed, wherein the drive mechanism comprises a driver that can be moved substantially in axial direction of the hollow shaft, by means of a drive, wherein the coupling pin in the coupled position is coupled to the driver. According to the invention the coupling pin is provided with a locking device for locking, that means protecting against getting detached, the coupling pin in the coupled position. In that way it can substantially be prevented that the coupling pin gets detached from the driver when this is not desirable, as a result of which the casing and/or a movable part (for instance a bead clamp device or turn-up mechanism) placed thereon no longer moves properly along with a movement of the driver.

In one embodiment the coupling pin attaches the casing to the driver, so that the casing together with the driver can be moved in axial direction of the hollow shaft. Moving the casing is particularly of importance in a building drum for building unvulcanized tyres.

In one embodiment the coupling pin attaches at least the first turn-up mechanism to the driver, so that a movement of the first turn-up mechanism can be driven by a movement of the driver.

In one embodiment the drive mechanism comprises a spindle, wherein the driver comprises a sleeve-shaped nut placed on the spindle. The use of a spindle in a hollow shaft of a tyre building machine is known per se, for instance from EP 1.771.295 (having one single spindle in the hollow shaft) or from EP 2.217.433 (having two spindles in the hollow shaft).

In one embodiment the drive mechanism is a pull/push rod and the driver is placed on the pull/push rod, wherein the driver can be moved in axial direction of the hollow shaft by shifting the pull/push rod. The use of a pull/push rod in a hollow shaft of a tyre building machine is known per se, for instance from NL 2003350.

In one embodiment the building drum comprises two bead clamps that are placed around the central shaft and at axial distance from each other on either side of a centre plane of the tyre drum, wherein at least a first bead clamp of the two bead clamps is placed on the casing.

In one embodiment the building drum comprises a first and a second axially extending turn-up mechanism, which are placed on either side of the centre plane outside of the bead clamps. In one embodiment the turn-up mechanism comprises a bladder turn-up device or a turn-up stitcher device. In one embodiment the turn-up stitcher device comprises a group of turn-up arms, wherein the arms at a first free outer end oriented towards the bead clamps are provided with a turn-up roller.

In one embodiment at least the first turn-up mechanism with an adjacent first bead clamp is placed on the casing.

In one embodiment of a building drum to be used in building an unvulcanized tyre using rubber tyre components, having two beads that may or not be provided with a bead filling strip, the tyre drum is further provided with:

an expansion device for radially expanding a part of the tyre components situated within the bead clamps, wherein the first and second turn-up mechanism are each provided with a first and a second group of turn-up arms, respectively, wherein the arms at a first free outer end oriented towards the bead clamps are provided with a turn-up means, particularly a turn-up roller or turn-up belt, and at an opposite second outer end are hinged to an arm support, wherein the tyre drum is furthermore provided with means for axially moving the arm support in order to move the second outer ends of the arms of the first and second group of arms towards each other, while in respective radial planes from an initial position having the arms tilt substantially parallel to the shaft into an inclined tilting position in order to move the first outer ends of the arms axially and radially to the outside while pressing the part of the tyre components that is situated axially outside of the bead clamps against the expanded part of the tyre components that is situated within the bead clamps, wherein the casing is a first casing on which the first turn-up mechanism with an adjacent first bead clamp of the two bead clamps is placed, wherein the building drum further comprises a second casing on which the second turn-up mechanism with an adjacent second bead clamp of the two bead clamps is placed, and wherein the first and the second casing are placed on either side, respectively, of the centre plane of the tyre drum.

According to a second aspect the invention provides a building drum for building an unvulcanized tyre or air spring using rubber components, comprising:

a central shaft with a circumferential wall having an outer diameter, a casing with a circumferential surface for arranging the components thereon, wherein the casing comprises a substantially continuous opening having an inner diameter that corresponds with the outer diameter of the circumferential wall of the central shaft, wherein the casing is detachably attached to the central shaft, and wherein the casing is provided with a movable coupling pin that can be placed in the coupled position in which the coupling pin extends into an opening in the circumferential wall of the central shaft, and in an uncoupled position in which the coupling pin is placed outside of the circumferential wall of the central shaft, characterised in that the casing furthermore comprises a locking device with a locking pin, wherein the locking pin is adapted for in the coupled position of the coupling pin engaging thereon in order to substantially block a movement of the coupling pin, wherein the locking device comprises a locking member that is adapted for providing an indication of the correct mounting of the casing. Optionally said building drum can be further supplemented with one or more characterising measures of the embodiments mentioned above.

According to a third aspect the invention relates to a use of a building drum as described above, for manufacturing an unvulcanized tyre or air spring using rubber components.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

SHORT DESCRIPTION OF THE DRAWINGS

The invention will be elucidated on the basis of a number of exemplary embodiments shown in the attached drawings, in which.

DETAILED DESCRIPTION OF THE DRAWINGS

Figure 1:
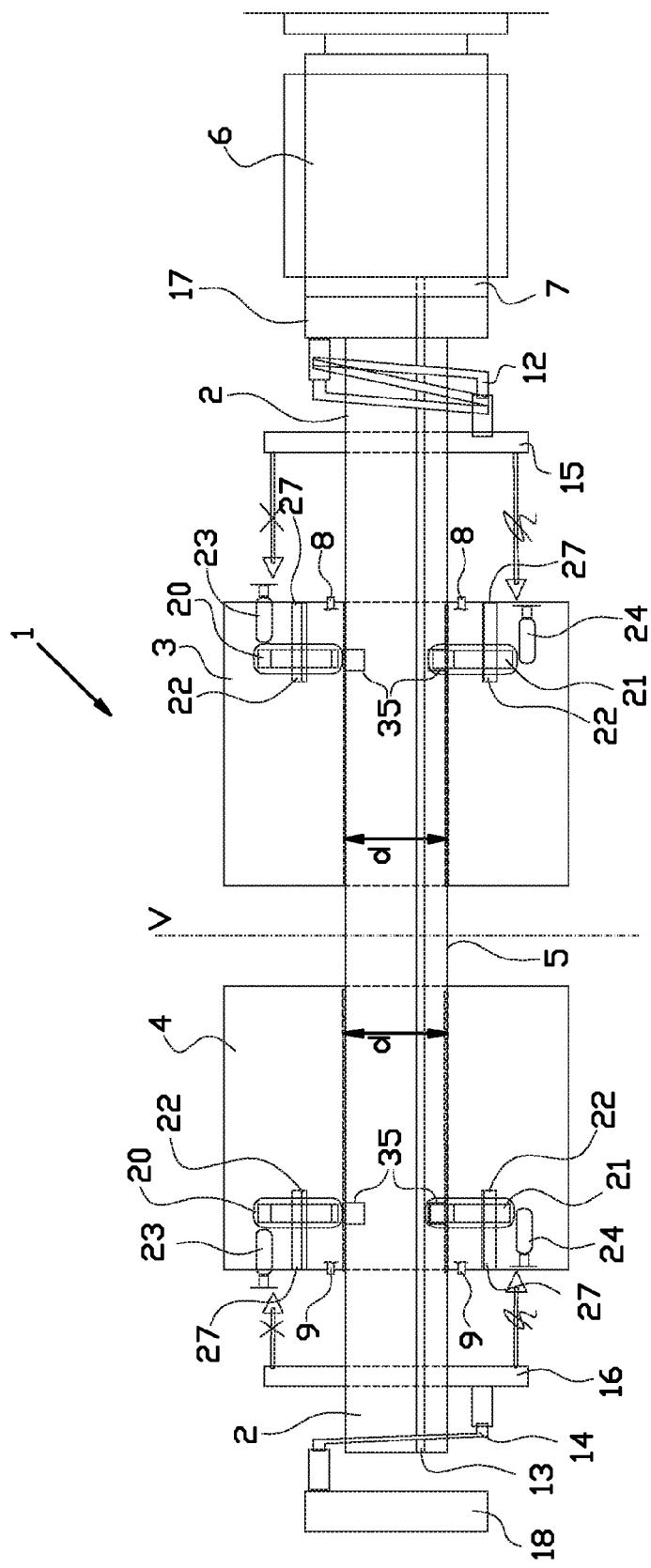
FIG. 1 shows a schematic view of a building drum according to the invention, partially in cross-section.

In FIG. 1 a schematic side view is shown of an inventive building drum for building for instance a tyre. The building drum 1 as shown comprises a drum shaft 2 with a circumferential wall 5. Placed on the drum shaft 2 are a first casing 3 forming the first drum half, and a second casing 4 forming a second drum half, wherein the inner diameter d of the first and second casing 3, 4 corresponds with, therefore is substantially equal to, the outer diameter of the circumferential wall 5 of the drum shaft 2.

Via a pressure medium coupling 6 rotatable about the drum shaft 2, and provided with pressure medium connections 7, a pressure medium unit (not shown) can be connected to pressure medium connections 8, 9 that are provided on each building drum half 3, 4. It is noted here that said pressure medium connections 8, 9 are schematically shown in FIG. 1. Furthermore each building drum half 3, 4 comprises elements that are not further shown and that are operable by the pressure medium. Such elements may for instance be turn-up arms 74 or bead clamps 73, as shown in FIG. 5.

The pressure medium connections 8 of the first building drum half 3 are connected to the pressure medium connections 7 of the rotatable pressure medium coupling 6 by means of a first tube set 12. Furthermore pressure medium ducts 13 are arranged in a manner known per se in the drum shaft 2 and which on the one hand are connected to the rotatable pressure medium coupling 6 and on the other hand are connected to the pressure medium connections 9 of the second building drum half 4 by means of a second tube set 14.

Each tube set 12, 14 is connected to a building drum half mounting ring 15, 16. Said mounting ring 15, 16 can be connected to the pressure medium connections 8, 9 of the building drum half 3, 4 in question, so that the pressure medium connections 8, 9 of the building drum half 3, 4 in question are connected to the tube set 12, 14 by means of the building drum half mounting ring 15, 16 in question.

As shown in FIG. 1 the first tube set 12 is connected to a coupling mounting ring 17 that can be connected to the pressure medium connections 7 of the pressure medium coupling 6, so that the pressure medium connections 7 of the pressure medium coupling 6 are connected to the first tube set 12 by means of the coupling mounting ring 17. FIG. 1 furthermore shows that the second tube set 14 is connected to a drum shaft mounting ring 18 that can be connected to the pressure medium ducts in the drum shaft 2, so that said pressure medium ducts are connected to the second tube set 14 by means of the drum shaft mounting ring 18.

Both building drum halves 3, 4 are provided with at least two coupling pins 20, 21 that can be moved substantially in a radial direction with respect to the drum shaft 2. The coupling pins 20, 21 can be placed in an uncoupled position (coupling pins with reference number 20) wherein the coupling pin 20 is placed substantially within the casing of the building drum halves 3, 4 and therefore outside of the circumferential wall 5 of the drum shaft 2. In this position the casing 3, 4 in question is not coupled to the drum shaft 2 and can be slid from the drum shaft 2. Furthermore the coupling pins 20, 21 can be placed in a coupled position (coupling pins with reference number 21) wherein the coupling pin 21 partially extends in an opening in the circumferential wall 5 of the drum shaft 2.

Figure 2:
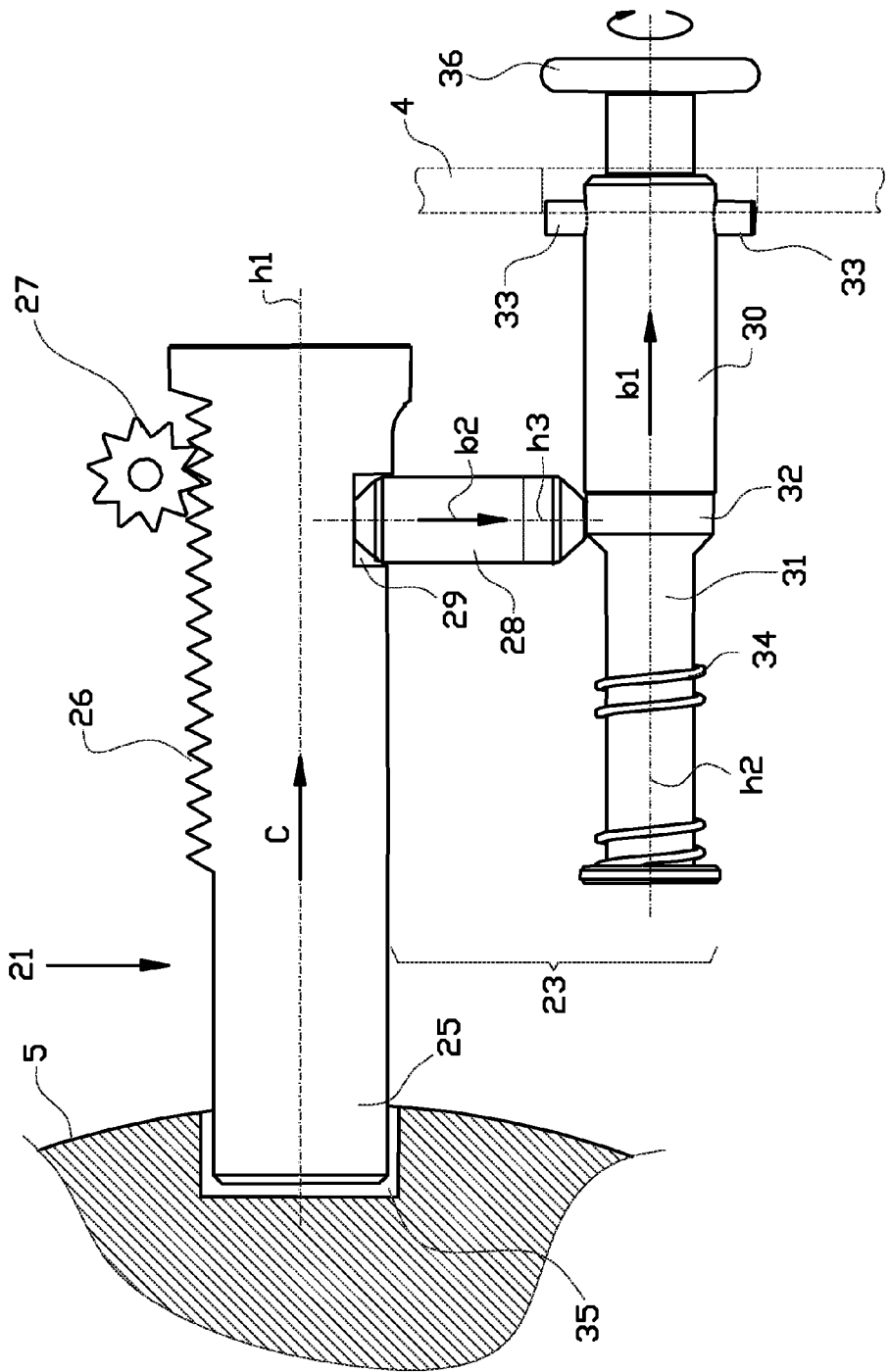
FIG. 2 shows a schematic side view of a first exemplary embodiment of a coupling pin with a locking device according to the invention.

As shown in more detail in FIG. 2, the coupling pin 21 at a first outer end comprises a bolt 25 which in the coupled position extends in an opening 35 in the circumferential wall 5 of the drum shaft 2. A part of the coupling pin 21 that faces away from the first outer end is provided with a rack 26 extending substantially in longitudinal direction. A toothed wheel 27 is furthermore disposed, which is placed so as to mesh with the rack 26 for driving a movement of the coupling pin 21, substantially along the centre line h1 thereof. By rotating the toothed wheel 27, the coupling pin 21 is moved from the coupled position as shown in FIG. 2, to an uncoupled position, in which the bolt 25 is placed entirely out of the opening 35.

Furthermore a locking device 23 is placed near each coupling pin 20, 21. As shown in more detail in FIG. 2, the locking device 23 comprises a locking pin 28 that is adapted for in the coupled position of the coupling pin 21, as shown in FIG. 2, engaging onto the coupling pin 21 in order to substantially block a movement of the coupling pin 21 along its centre line h1. For that purpose the coupling pin 21 is provided with a substantially radially oriented opening 29. As shown in FIG. 2 the coupling pin 21 can be moved along its centre line h1 and the locking pin 28 can be moved substantially transverse to the centre line h1 in the direction b2. By moving the locking pin 28 in radial direction of the coupling pin 21, it can be inserted into the opening 29 wherein a movement of the coupling pin along the centre line h1 is substantially blocked.

The locking device 23 as shown in detail in FIG. 2 furthermore comprises a locking member 30. As shown in detail in FIG. 2, the locking pin 28, at a side thereof that faces away from the coupling pin 21, abuts the locking member 30. In that case the locking pin 28 is provided with a spring (not shown) that pushes the locking pin against the locking member 30. The locking member 30 can be moved in axial direction, along the centre line h2, and in said axial direction is provided with parts of different diameters.

The locking member 30 can be moved in the direction b1 into a first position, wherein the locking pin 28 abuts a part 31 of the locking member 30 with a small diameter, such that the locking pin 28 does not engage onto the coupling pin 21. In this position of the locking member 30 and the locking pin 28, the coupling pin 21 can be moved in the direction c from the coupled position into the uncoupled position, and vice versa.

The locking member further comprises a control part 36 placed at an outer end of the locking member 30 and, at least in the said first position, extends outside of the casing wall of the building drum half 4. In this first position the locking member 30 is placed such with respect to the connecting device 15, 16 that the locking member 30, and particularly its control part, substantially prevents a connection of the lines 12, 13 to the connection 8, 9.

If the coupling pin 21 is placed in the coupled position, as shown in FIG. 2, the locking pin 28 can be slid into the opening 29. For that purpose the locking member 30 is moved in axial direction, opposite the direction b1. From the first position, in which the locking pin 28 abuts the part 31 with small diameter, the locking member successively comprises a second part, the diameter of which gradually increases (slope), and subsequently a third part 32 with a large diameter. The diameter of the third part 32 is such that, if the locking pin 28 abuts the third part 32 with the large diameter, the locking pin 28 engages onto the coupling pin 21, in particular engages in its opening 29. Due to an axial movement b of the locking member 30 the locking pin 28, which first abuts the first part 31 with the small diameter, is thus guided along the slope to the third part 32 with the large diameter. Because of this action the locking pin 28 is slid into the opening 29, counter to the direction b2.

The locking member is furthermore provided with a spring 34 that pushes or pre-stresses the locking member in a direction towards the first position, wherein the locking din 28 does not engage onto the coupling pin 21. The locking member is provided with cams 33 that can be brought into engagement in recesses that are provided in the building drum halves 3, 4 by a rotation r of the locking member 30, at least in the condition in which the locking pin 28 is placed in the opening 29, that means abuts the third part 32 with the larger diameter. This condition is schematically shown in FIG. 1 with reference number 24. In this condition a connection of lines is not hindered and the building drum half mounting rings 15, 16 can be connected to the building drum halves 3, 4 wherein the pressure medium connections 8, 9 of the building drum halves 3, 4 in question are connected to the tube set 12, 14 by means of the building drum half mounting rings 15, 16 in question.

Furthermore it is noted that in FIG. 2 the centre lines of the coupling pin 21 and the locking member 30 are drawn substantially parallel. This is a possible embodiment and is shown here to illustrate the operation of the locking device 23.

In the building drum halves 3, 4 of FIG. 1, the centre lines h1, h2 of the coupling pin 21 and the locking member 30 are not parallel. In fact the centre line h2 of the locking member 30 of FIG. 1 is oriented substantially transverse to the centre line h1 of the coupling pin. In comparison with FIG. 2 the locking member 30 is rotated over an angle of substantially 90 degrees about the centre line h3 of the locking pin 28. The centre line h2 of the locking member 30 is substantially parallel to the drum shaft 2 and the control part 36 is placed at a side of the building drum halves 3, 4 that faces away from the centre plane V.

In order to remove the building drum halves 3, 4 from the central shaft 2, optionally for placing another set of building drum halves thereon, the drum shaft mounting ring 18 that also forms an end plate of the central shaft 2, is removed from the shaft. The building drum half mounting rings 15, 16 are also uncoupled from the building drum halves 3, 4. By rotation r of the locking members 30, their cams 33 are released from their recesses in the building drum halves, as a result of which the locking member 30 is moved in longitudinal direction b, under the influence of the spring 34, so that the locking pin 28 abuts the first part 31 with the small diameter. In that way the locking pin 28 is removed from the opening 29 so that the coupling pin 21 can be moved in the uncoupled position indicated with reference number 20 in FIG. 1. For transferring the coupling pins from the coupled position (indicated with reference number 21 in FIG. 1) into the uncoupled position (indicated with reference number 20 in FIG. 1) the mechanic places a Allenkey in the opening 27 as a result of which the toothed wheel 22 is operable for driving an axial movement along the centre line of the coupling pin in question. After the coupling pins 20, 21 have all been placed in the uncoupled position, the building drum half in question can be removed from the central shaft.

Figure 3:
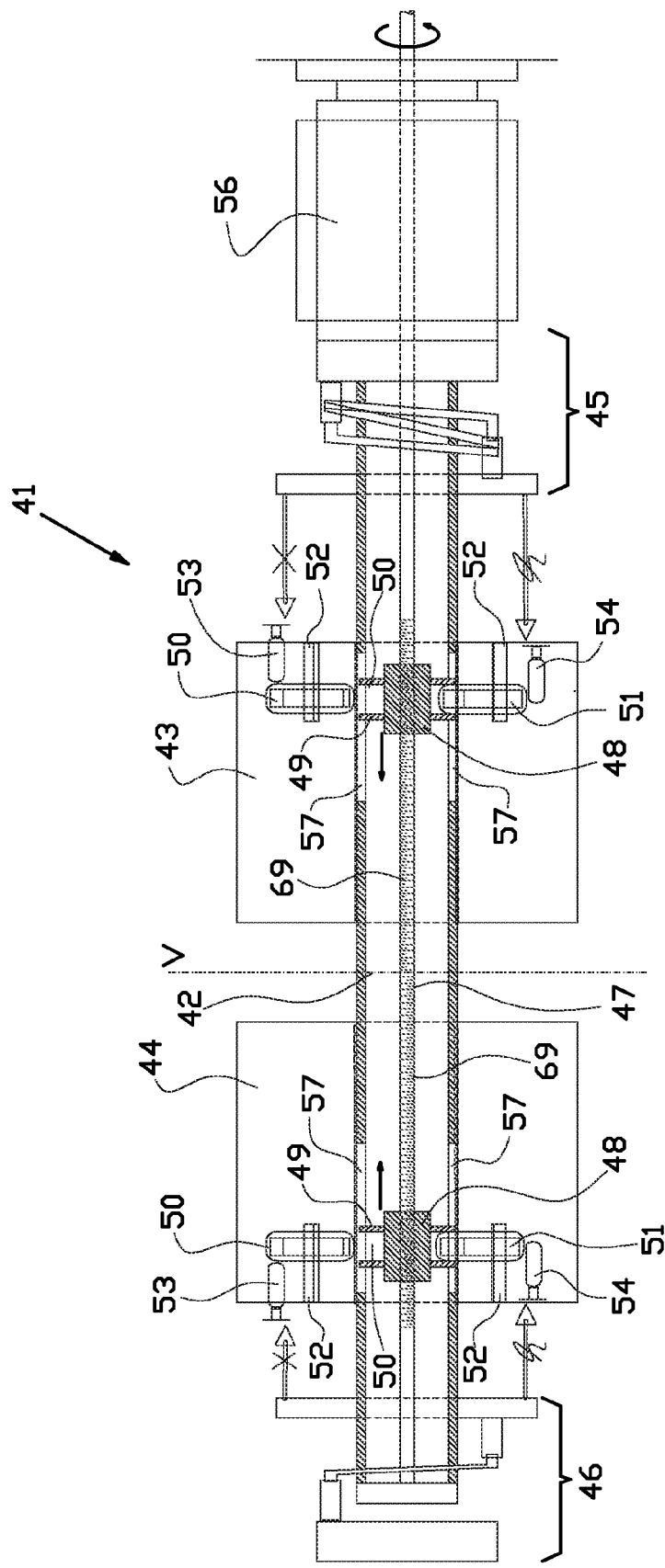
FIG. 3 shows a schematic view of a building drum according to the invention with a drive spindle in the hollow shaft.

FIG. 3 shows a schematic side view, partially in cross-section, of a second exemplary embodiment of a building drum according to the invention. In this exemplary embodiment as well the building drum 41 comprises a central shaft 42, which in this case is a hollow shaft. Within the hollow shaft 42 a drive mechanism is placed in the form of a spindle 47. Two drivers in the form of sleeve-shaped nuts 48 are placed on the spindle 47. When rotating the spindle 47, the sleeve-shaped nuts 48 will be moved in substantially axial direction of the hollow shaft 42. Because during building an unvulcanized tyre, the casings 43, 44 will have to be moved towards each other and away from each other, the spindle 47, on either side of the centre plane V, is threaded in opposite orientation which thread is of substantially the same pitch. As a result, in case of driving the spindle 47 in a rotating manner, the sleeve-shaped nuts 48 will both move substantially at the same speed towards the centre plane V, or move away from the centre plane V.

The sleeve-shaped nuts 48 are provided with coupling elements 49 that extend substantially in radial direction from the hollow shaft 42, into axially oriented slits 57 in the hollow shaft 42. The coupling elements 49 at the outer end facing the outside of the hollow shaft 42, are provided with an opening 50 for the coupling pins 50, 51 of the casings 43, 44 to extend therein. In the coupled position of the coupling pins (indicated with reference number 51 in FIG. 3), the casings 43, 44 are thus attached to the central shaft 42, and moreover they can be moved together with the sleeve-shaped nuts 48 in axial direction by driving the spindle 47.

In this exemplary embodiment as well the movable coupling pin 50, 51 can be driven by means of a toothed wheel 52 that meshes with a rack on the coupling pin 50, 51, as shown in detail in FIG. 2. This exemplary embodiment also comprises a locking device 53, 54 as discussed in more detail in the previous exemplary embodiment referring to FIG. 2.

The exemplary embodiment of FIG. 3 by means of the spindle 47 placed in the hollow shaft 42 is thus adapted for driving a substantially axial movement of the casings 43, 44, wherein the coupling pins 50, 51 couple the casings 43, 44 to the sleeve-shaped nuts 48 within the hollow shaft 42. In this exemplary embodiment for driving a movement of the bead clamps and/or turn-up mechanisms that are arranged on the casings 43, 44 as for instance described and shown in FIG. 4, use is made of compressed air that can be connected by means of a rotatable pressure medium coupling 56, and pressure medium connections 45, 46 for connecting pressure medium lines to the respective casings 43, 44. In this exemplary embodiment as well the locking device 53, 54 is provided with a locking member, as described in detail referring to FIGS. 2 and 3, wherein the locking member in the condition in which the locking pin does not engage onto the coupling pin (indicated with reference number 50 in FIG. 3) is placed such that the locking member substantially prevents a connection of the pressure medium connections 45, 46.

In the coupled condition, in which the locking pin engages onto the coupling pin (as indicated with reference number 51 in FIG. 3), the locking member is placed substantially within the casing 43, 44 as a result of which the pressure medium connections 45, 46 can be operationally connected to the cuter ends of the casings 43, 44 that extend away from the centre plane V.

Figure 4:
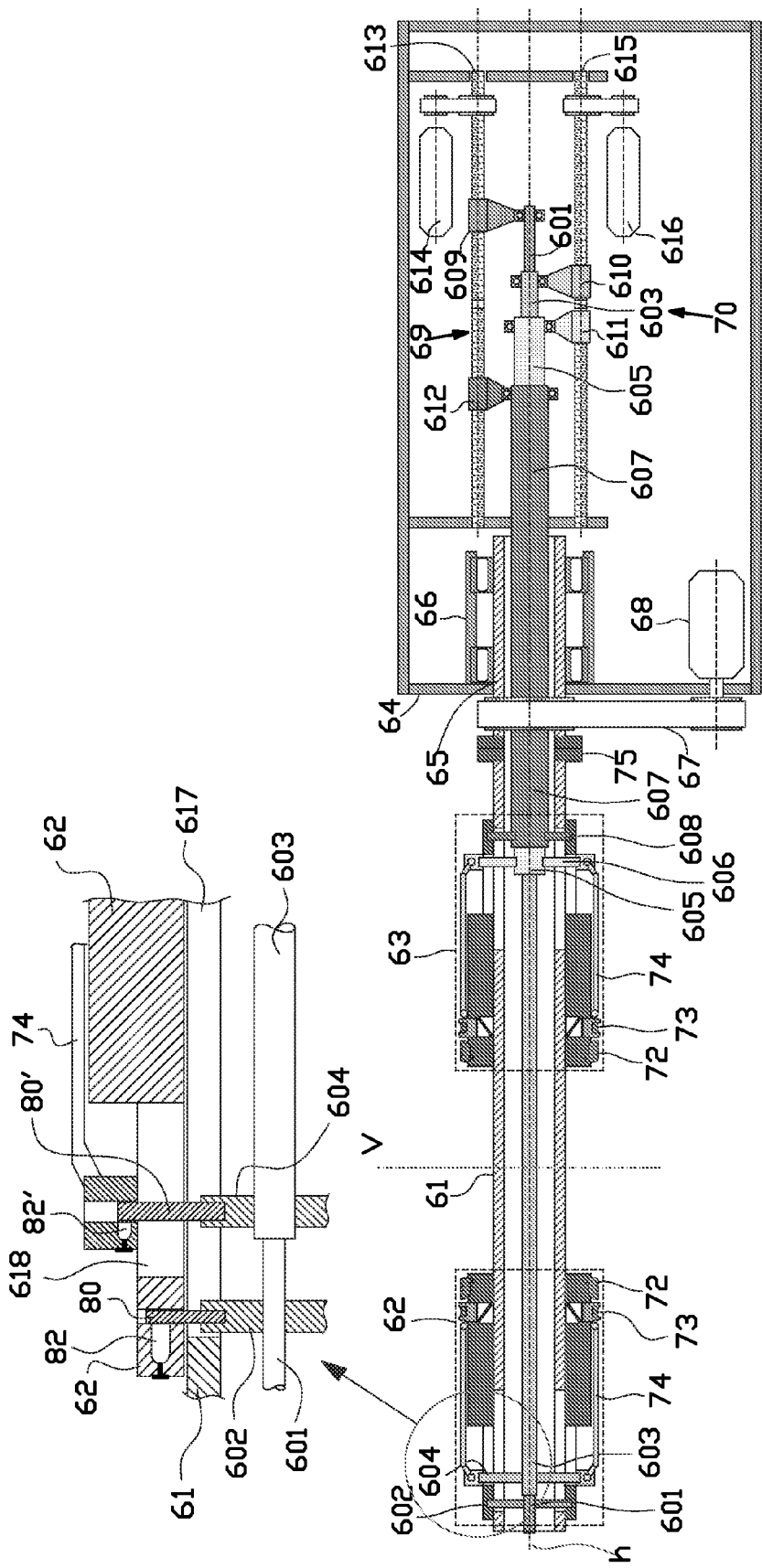
FIG. 4 shows a schematic view of a building drum according to the invention with concentric pull/push rods in the hollow shaft.

FIG. 4 shows a third exemplary embodiment of a tyre building drum 60 according to the invention. The tyre building drum 60 comprises a hollow drum shaft 61 in which a transmission for driving the drum halves 62, 63 and of the folding arm units 74 is arranged. Said transmission comprises four pull/push rods 601, 603, 605, 607 that are placed concentrically in the hollow drum shaft 61. The use of pull/push rods for driving drum halves and folding arm units is known per se and is for instance described in Dutch patent application 2003350.

In the embodiment according to this invention, as shown in FIG. 4, the coupling between the drum halves 62, 63 and the folding arm units 74 is executed by means of coupling pins 80, 80' that are provided with a locking device 82, 82' as shown in more detail in FIGS. 5A, 5B, 5C and 5D.

According to the invention the pull/push rods 601, 603 (see detail sketch), are provided with coupling elements 602, 604, 605, 606. Said coupling elements extend substantially in radial direction of the hollow drum shaft 61 up into the axially oriented slots 617 in the wall of the drum shaft 61.

The first drum half 62 is connected to a first pull/push rod 601 by means of a first coupling pin 80 which in the coupled condition of the coupling pin 80, extends into a substantially radial opening in an outer end of the coupling element 602 facing away from the pull/push rod 601, as shown in FIG. 4. By means of the coupling pin 80 the first drum half 62 is thus connected to the drum shaft 61.

As the folding arm units 74, at least during a part of the method for manufacturing an unvulcanized tyre, have to be driven independent from the drum half 62, the folding arm unit 74 of the first drum half 62, by means of a second coupling pin 80' extending through a substantially axially oriented opening 618 of the casing 62, extends up into a radial opening of a coupling element 604 of its own pull/push rod 603.

Due to a joint movement of both pull/push rods 601 and 603, the first building drum half 62 can be moved together with its folding arm unit 74. If the second pull/push rod 603 is moved with respect to the first pull/push rod 601, the folding arm unit 74 will be able to carry out a motion with respect to the first drum half 62, for instance for turning-up and/or stitching rubber components on parts of the unvulcanized tyre or air spring that are situated within the bead clamps 73.

In said third exemplary embodiment, as shown in FIG. 4, use is made of a locking device wherein the locking member is a part of the locking pin. As shown in more detail in FIGS. 5A, 5B, 5C and 5D, the casing 62 is provided with a coupling pin 80 that can be moved in axial direction of the coupling pin 80 in an uncoupled position as shown in the side view of FIG. 5B, and in a coupled position as indicated in the side view of FIG. 5D. Furthermore a locking pin is placed near the coupling pin 80 wherein the locking pin 82 at a side facing the coupling pin 80 comprises a bolt 84 that can engage into an opening 86 of the coupling pin 80. The locking pin 82 is pre-stressed to the coupled position by means of a spring as shown in FIGS. 5C and 5D. As soon as the opening 86 of the coupling pin 80 is placed in the extension of the locking pin 82, when placing the coupling pin 80 in the coupled position, the spring 83 will push the bolt 84 into the opening 86, as a result of which a movement of the coupling pin 80 is substantially blocked.

Figures 5A, 5B:
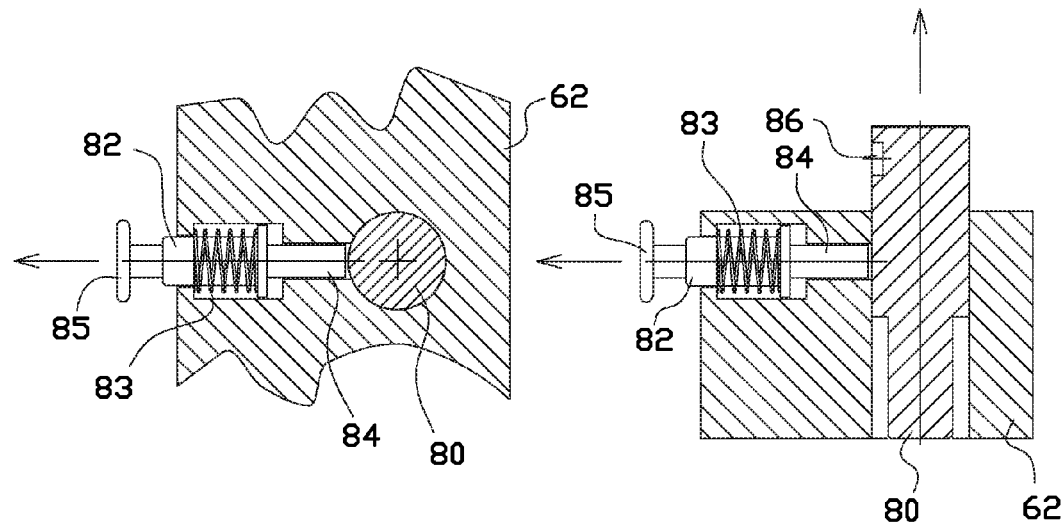
FIGS. 5A and 5B show a schematic view in cross-section of a second exemplary embodiment of a coupling pin with a locking device according to the invention in an uncoupled position.
Figures 5C, 5D:
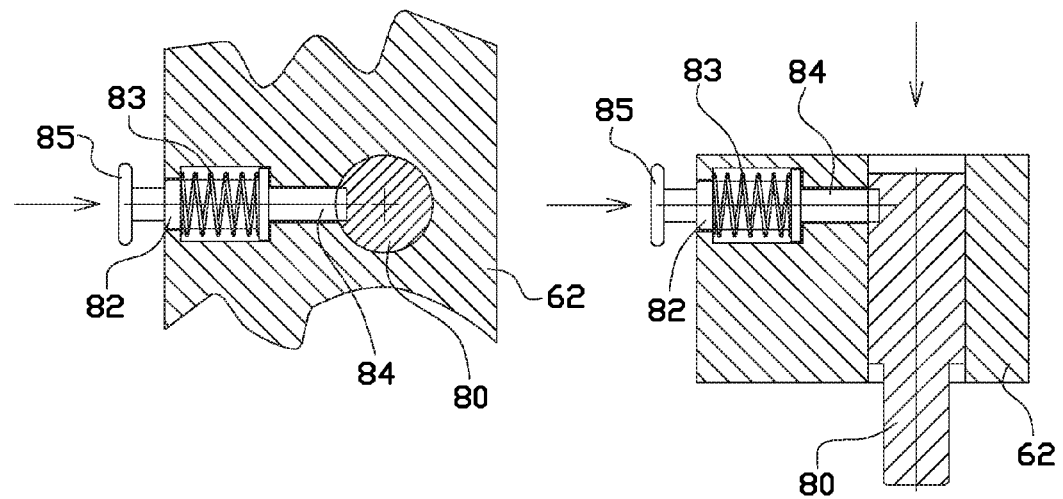
FIGS. 5C and 5D show a schematic view in cross-section of the exemplary embodiment of FIGS. 5A and 5B in the coupled position.

At an outer end of the locking pin 82 which end faces away from the coupling pin 80; a control part 85 is arranged that may also serve as locking member that substantially prevents a connection of lines to the casing 62 if the locking pin 82 does not engage onto the coupling pin 80 as shown in FIGS. 5A and 5B.

The above description is included to illustrate the operation of preferred embodiments of the invention and not to limit the scope of the invention. Starting from the above explanation many variations that fall within the scope of the present invention as described in the attached claims, will be evident to an expert.

Summarising the invention relates to a building drum for building an unvulcanized tyre or air spring using rubber components. The building drum comprises a central shaft and a casing that can be slid onto the shaft. The casing is detachably attached to the shaft via a coupling pin that can be moved into a coupled position for mutually coupling the shaft and the casing and into an uncoupled position in which the casing can be removed from the central shaft. The casing further comprises a locking device with a locking pin, wherein the locking pin is adapted for in the coupled position of the coupling pin engaging thereon for substantially blocking a movement of the coupling pin. The locking device comprises a locking member that in a condition in which the locking pin does not engage onto the coupling pin, is placed such that it prevents a connection of lines to the casing, and/or provides an indication of the casing being mounted incorrectly.

The invention claimed is:

1. Building drum for building an unvulcanized tire or air spring using rubber components, comprising:
   a central shaft with a circumferential wall having an outer diameter,
   a casing with a circumferential surface for arranging the components thereon, wherein the casing comprises a substantially continuous opening having an inner diameter that corresponds with the outer diameter of the circumferential wall of the central shaft, wherein the casing is detachably attached to the central shaft, and wherein the casing is provided with a movable coupling pin that can be placed in a coupled position in which the coupling pin extends in an opening in the circumferential wall of the central shaft, and in an uncoupled position in which the coupling pin is placed outside of the circumferential wall of the central shaft, characterized in that the casing further comprises a locking device with a locking pin, wherein the locking pin is adapted for in the coupled position of the coupling pin engaging thereon in order to substantially block a movement of the coupling pin, wherein the casing comprises a connecting device for connecting an electric, pneumatic or hydraulic line to the casing, and wherein the locking device comprises a locking member, wherein the locking member in a condition in which the locking pin does not engage onto the coupling pin, is placed such with respect to the connecting device that the locking member substantially prevents a connection of the line to the connecting device.

2. Building drum according to claim 1, wherein the locking member is adapted for, at least in the condition in which the locking pin does not engage onto the coupling pin, providing an indication of the incorrect mounting of the casing.

3. Building drum according to claim 1, wherein the coupling pin comprises a center line and wherein the coupling pin can be moved along the center line between the coupled position and the uncoupled position, and wherein the locking pin can be moved substantially transverse to the center line.

4. Building drum according to claim 1, wherein the coupling pin is provided with an opening, wherein the opening in the coupled position of the coupling pin is placed in an extension of the locking pin.

5. Building drum according to claim 1, wherein the locking member is a part of the locking pin.

6. Building drum according to claim 1, wherein the locking pin on a side facing away from the coupling pin substantially abuts the locking member, wherein the locking pin, at least in the condition in which the locking pin does not engage onto the coupling pin, keeps the locking member in the condition that substantially prevents a connection of the line to the connecting device.

7. Building drum according to claim 6, wherein the locking member is adapted for bringing the locking pin into engagement with the coupling pin in the coupled position of the coupling pin.

8. Building drum according to claim 6, wherein the locking member is pre-stressed to the condition that substantially prevents a connection of the line to the connecting device.

9. Building drum according to claim 1, wherein the locking member in the condition in which the locking pin does not engage onto the coupling pin, extends outside of a circumferential surface of the casing or outside of a distal outer end of the casing.

10. Building drum according to claim 9, wherein the connecting device is placed substantially in or close to a distal outer end of the casing, and wherein a first set of lines is connected to a building drum mounting ring, which building drum mounting ring can be rotation-fixedly connected to the respective distal outer end of the casing for forming a connection between the lines of the first set of lines and the connecting device, and wherein the locking member extending out of the casing and/or locking pin substantially prevents a connection of the building drum mounting ring to the distal outer end of the casing.

11. Building drum according to claim 1, wherein the central shaft is a hollow shaft, wherein within the hollow shaft a drive mechanism is placed, wherein the drive mechanism comprises a driver that can be moved substantially in axial direction of the hollow shaft by means of a drive, wherein the coupling pin in the coupled position is coupled to the driver.

12. Building drum according to claim 11, wherein the coupling pin attaches the casing to the driver, so that the casing together with the driver can be moved in axial direction of the hollow shaft.

13. Building drum according to claim 11, wherein the building drum comprises a first and a second axially extending turn-up mechanism, wherein the coupling pin attaches at least the first turn-up mechanism to the driver, so that a movement of the first turn-up mechanism can be driven by a movement of the driver.

14. Building drum according to claim 11, wherein the drive mechanism comprises a spindle and wherein the driver comprises a sleeve-shaped nut placed on the spindle.

15. Building drum according to claim 11, wherein the drive mechanism is a pull/push rod and wherein the driver is placed on the pull/push rod, wherein the driver can be moved in axial direction of the hollow shaft by shifting the pull/push rod.

16. Building drum according to claim 1, wherein the building drum comprises two bead clamps that are placed around the central shaft and at axial distance from each other on either side of a center plane of the tire drum, wherein at least a first bead clamp of the two bead clamps is placed on the casing.

17. Building drum according to claim 16, wherein the building drum comprises a first and a second axially extending turn-up mechanism, which are placed on either side of the center plane axially outside of the bead clamps.

18. Building drum according to claim 17, wherein at least the first turn-up mechanism with an adjacent first bead clamp is placed on the casing.

19. Building drum according to claim 17, to be used in building an unvulcanized tire using rubber tire components, having two beads that may or not be provided with a bead filling strip, wherein the tire drum is further provided with an expansion device for radially expanding a part of the tire components situated axially within the bead clamps, wherein the first and second turn-up mechanism are each provided with a first and a second group of turn-up arms, respectively, wherein the arms at a first free outer end oriented towards the bead clamps are provided with a turn-up means, and at an opposite second outer end are hinged to an arm support, wherein the tire drum is furthermore provided with means for axially moving the arm support in order to move the second outer ends of the arms of the first and second group of arms towards each other, while in respective radial planes from an initial position having the arms tilt from substantially parallel to the shaft into an inclined tilting position in order to move the first outer ends of the arms axially and radially to the outside while pressing the part of the tire components that is situated axially outside of the bead clamps against the expanded part of the tire components that is situated axially within the bead clamps,
   wherein the casing is a first casing on which the first turn-up mechanism with an adjacent first bead clamp of the two bead clamps is placed,
   wherein the building drum further comprises a second casing on which the second turn-up mechanism with an adjacent second bead clamp of the two bead clamps is placed, and
   wherein the first and the second casings are placed on either side, respectively, of the center plane of the tire drum.

\* \* \* \* \*